United States Patent
Ling (10) Patent No.: US 11,647,478 B2
(45) Date of Patent: May 9, 2023

(54) NETWORK DISCOVERY IN AN AUTOCONFIGURED BACKHAUL TRANSCEIVER

(71) Applicant: MaxLinear, Inc., Carlsbad, CA (US)

(72) Inventor: Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 14 days.

(21) Appl. No.: 14/602,786

(22) Filed: Jan. 22, 2015

(65) Prior Publication Data

US 2015/0215853 A1   Jul. 30, 2015

Related U.S. Application Data (60) Provisional application No. 61/930,006, filed on Jan. 22, 2014.

(51) Int. Cl.
| | |
|---|---|
| *H04W 64/00* | (2009.01) |
| *H04W 48/12* | (2009.01) |
| *H04B 7/06* | (2006.01) |
| *H04W 16/28* | (2009.01) |
| *H04W 92/12* | (2009.01) |

(52) U.S. Cl.
CPC ......... *H04W 64/003* (2013.01); *H04W 48/12* (2013.01); *H04B 7/0617* (2013.01); *H04W 16/28* (2013.01); *H04W 92/12* (2013.01)

(58) Field of Classification Search
USPC .............. 370/252, 328, 339; 455/404.2, 440, 455/456.1; 342/74, 75, 81
See application file for complete search history.

(56) References Cited

U.S. PATENT DOCUMENTS

| | | | |
|---|---|---|---|
| 4,675,880 A | 6/1987 | Davarian | |
| RE32,905 E * | 4/1989 | Baran | H04B 7/216 370/320 |
| 5,881,098 A * | 3/1999 | Tzou | H04B 1/707 375/152 |
| 5,894,291 A * | 4/1999 | Lee | H01Q 1/1242 343/890 |
| 5,940,428 A * | 8/1999 | Ishiguro | H04B 1/7085 375/150 |
| 6,005,640 A | 12/1999 | Strolle | |

(Continued)

*Primary Examiner* — Nguyen H Ngo
(74) *Attorney, Agent, or Firm* — Buchalter; Jason W. Croft (57) ABSTRACT

A microwave backhaul transceiver comprises a plurality of antenna arrays, positioning circuitry, and signal processing circuitry. The microwave backhaul transceiver may determine, via the positioning circuitry, a location of the small cell backhaul transceiver. The microwave backhaul transceiver may, generate, via the signal processing circuitry, a beacon signal that uniquely indicates the location. The microwave backhaul transceiver may transmit the beacon signal via at least one of the antenna arrays. The beacon signal may be generated using a spreading code generated from a unique identifier of the location. The unique identifier of the location may comprise global positioning system coordinates and/or a street address. During the transmitting, a directionality at which the beacon radiates from a particular one of the antenna arrays may be varied such that the beacon is transmitted in multiple directions from the particular one of the antenna arrays.

13 Claims, 5 Drawing Sheets

(56) References Cited

U.S. PATENT DOCUMENTS

| | | | | |
|---|---|---|---|---|
| 6,661,904 B1* | 12/2003 | Sasich | | H04N 19/467 |
| | | | | 375/E7.206 |
| 6,822,595 B1* | 11/2004 | Robinson | | H03M 3/51 |
| | | | | 341/143 |
| 7,026,992 B1* | 4/2006 | Hunt | | G01S 5/0215 |
| | | | | 342/357.61 |
| 7,620,112 B2 | 11/2009 | Tang | | |
| 8,135,403 B1* | 3/2012 | Oh | | H04B 7/0617 |
| | | | | 370/331 |
| 8,416,836 B2 | 4/2013 | Kirshenbaum | | |
| 8,989,762 B1 | 3/2015 | Negus | | |
| 9,642,023 B2* | 5/2017 | Ling | | H04W 24/02 |
| 2003/0032424 A1 | 2/2003 | Judd | | |
| 2005/0113129 A1* | 5/2005 | Robinson | | H04W 36/18 |
| | | | | 455/524 |
| 2005/0136980 A1 | 7/2005 | Kim | | |
| 2007/0063911 A1* | 3/2007 | Davidson | | H01Q 3/32 |
| | | | | 343/810 |
| 2007/0147485 A1 | 6/2007 | Sakamoto | | |
| 2008/0167047 A1* | 7/2008 | Abedi | | H04W 36/18 |
| | | | | 455/442 |
| 2008/0187029 A1* | 8/2008 | Cho | | H04L 5/0007 |
| | | | | 375/141 |
| 2008/0233879 A1 | 9/2008 | Sasaki | | |
| 2008/0274732 A1 | 11/2008 | Boutigny | | |
| 2009/0023462 A1 | 1/2009 | Dent | | |
| 2009/0207945 A1 | 8/2009 | Sasaki | | |
| 2010/0228480 A1* | 9/2010 | Lithgow | | G01S 19/00 |
| | | | | 701/530 |
| 2010/0240327 A1 | 9/2010 | Lambrecht | | |
| 2011/0267977 A1* | 11/2011 | Doppler | | H04W 48/16 |
| | | | | 370/254 |
| 2012/0155887 A1 | 6/2012 | Youn | | |
| 2012/0163501 A1* | 6/2012 | Dong | | H04L 27/2096 |
| | | | | 375/300 |
| 2012/0169541 A1* | 7/2012 | Singh | | G01S 1/02 |
| | | | | 342/417 |
| 2012/0207048 A1 | 8/2012 | Kim | | |
| 2013/0089042 A1 | 4/2013 | Negus | | |
| 2013/0185617 A1* | 7/2013 | Roh | | H04W 4/00 |
| | | | | 370/328 |
| 2013/0229309 A1 | 9/2013 | Thomas | | |
| 2013/0252631 A1* | 9/2013 | Alizadeh-Shabdiz | | |
| | | | | H04W 4/025 |
| | | | | 455/456.1 |
| 2014/0031072 A1 | 1/2014 | Koorapaty | | |
| 2014/0077995 A1* | 3/2014 | Artemenko | | H01Q 3/24 |
| | | | | 342/367 |
| 2014/0133542 A1* | 5/2014 | Kangas | | H04B 1/712 |
| | | | | 375/230 |
| 2014/0262064 A1* | 9/2014 | Myrland | | A63B 71/02 |
| | | | | 160/84.02 |
| 2014/0269532 A1* | 9/2014 | Huang | | H04W 74/0833 |
| | | | | 370/329 |
| 2014/0347222 A1 | 11/2014 | Ling | | |
| 2014/0370936 A1 | 12/2014 | Ling | | |
| 2015/0061931 A1* | 3/2015 | Krasner | | G01S 5/145 |
| | | | | 342/357.29 |
| 2015/0109943 A1* | 4/2015 | Sahin | | H04W 24/02 |
| | | | | 370/252 |
| 2015/0185088 A1* | 7/2015 | Rabieirad | | A61B 5/01 |
| | | | | 374/122 |
| 2015/0188584 A1 | 7/2015 | Laurent-Michel | | |
| 2015/0215853 A1 | 7/2015 | Ling | | |
| 2015/0215854 A1 | 7/2015 | Ling | | |
| 2015/0227966 A1* | 8/2015 | Satyamoorthy | | G06Q 30/0246 |
| | | | | 705/14.42 |
| 2015/0230105 A1 | 8/2015 | Negus | | |
| 2015/0334635 A1* | 11/2015 | Caretti | | H04W 48/10 |
| | | | | 370/335 |
| 2016/0238189 A1* | 8/2016 | Angel | | F24J 2/542 |

\* cited by examiner

NETWORK DISCOVERY IN AN AUTOCONFIGURED BACKHAUL TRANSCEIVER

PRIORITY CLAIM

This application claims priority to the following application(s), each of which is hereby incorporated herein by reference:
U.S. provisional patent application 61/930,006 titled "Network Discovery in an Autoconfigured Backhaul Transceiver" filed on Jan. 22, 2014.

INCORPORATION BY REFERENCE

The entirety of each of the following applications is hereby incorporated herein by reference:
U.S. patent application Ser. No. 14/602,809, titled "Autoconfigured Backhaul Transceiver," filed Jan. 22, 2015.

BACKGROUND

Conventional methods and systems for backhauling small cell basestations are too costly to install and maintain. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Systems and/or methods are provided for network discovery in an autoconfigured backhaul transceiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
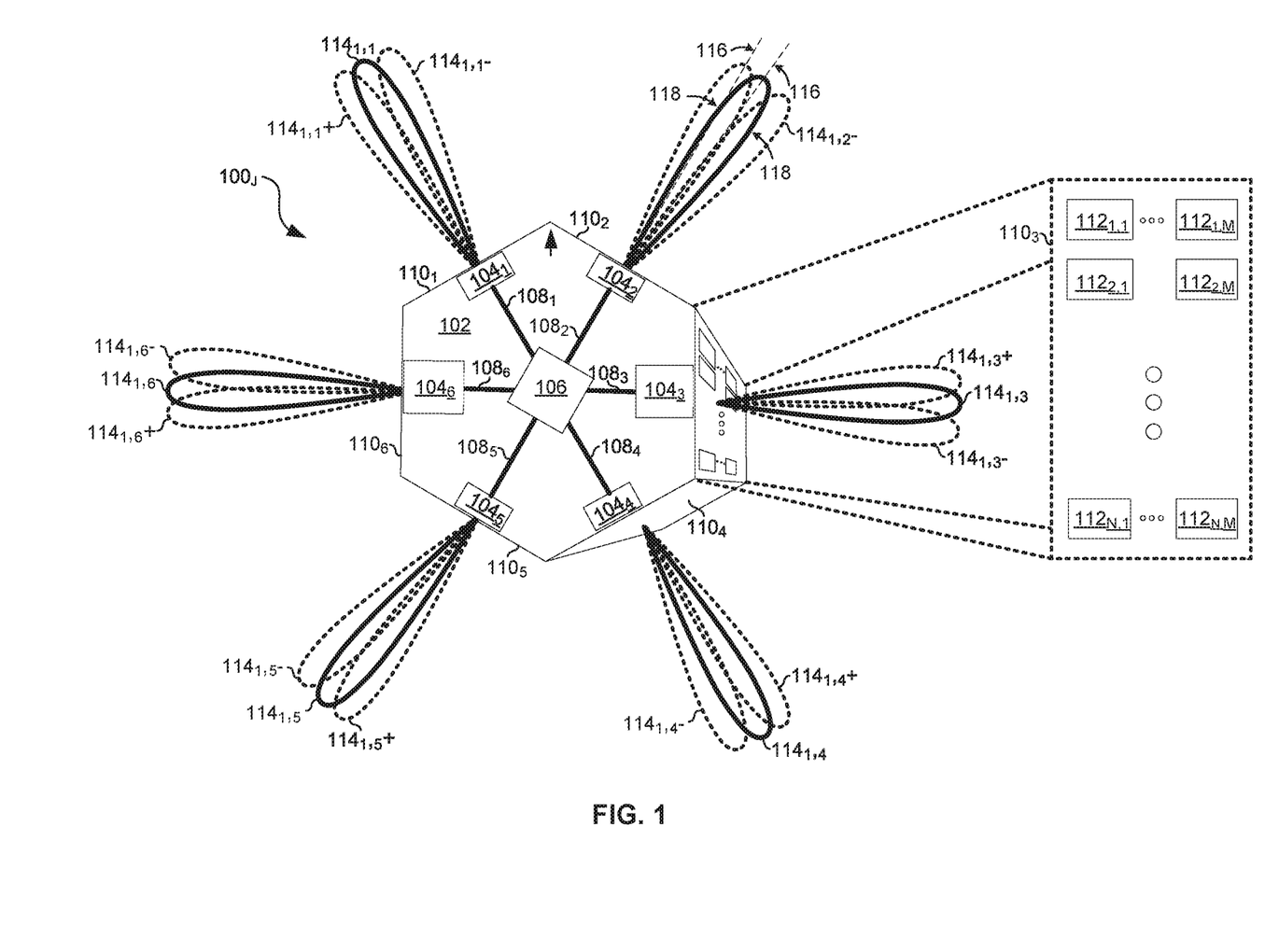
FIG. 1 depicts an autoconfigured small cell backhaul transceiver, in accordance with an example, implementation of this disclosure.

FIG. 1 is a diagram illustrating an autoconfigured small cell backhaul transceiver, in accordance with an implementation of this disclosure. The depicted small cell backhaul transceiver $100_j$ comprises structural elements 102, a plurality of antenna arrays 110 and corresponding phased-array transceiver front-ends 104, a modem 106, and bus(ses) 108.

The structural elements 102 may comprise, for example, one or more printed circuit boards and a plastic or metal housing arranged as a sphere or polyhedron, for example. As a non-limiting example, the small cell backhaul transceiver $100_j$ is depicted as an octahedron in FIG. 1.

The traces (e.g., microstrip or stripline) or cable (e.g., copper or optical) $108_1$-$108_K$ form one or more data busses via which the modem 106 sends data to, and receives data from, the front-ends 104. In an example implementation each trace $108_k$ is a dedicated serial bus. In another example implementation, the traces $108_1$-$108_K$ are electrically coupled and form a single high-speed serial bus.

Each array $110_k$ (k between 1 and 6 for the example shown in FIG. 1) comprises an array of M (an integer) times N (an integer) antenna elements 112. In the example depicted, the elements 112 are in a regular two-dimensional array with each element indexed by row and column ($112_{2,1}$ is in row 2 and column 1 of the array 110). In other implementations, the array elements 112 may be irregularly spaced/arranged and/or arranged in three-dimensions. Each antenna element $112_{n,m}$ may be, for example, a microstrip patch.

The modem circuit 106 is operable to perform modulation functions such as, for example, bit-to-symbol mapping, interleaving, forward error correction encoding. The modem circuit 106 is operable to perform demodulation functions such as, for example, symbol-to-bit demapping, deinterleaving, forward error correction decoding.

For transmit operations, each front-end subsystem $104_k$ is operable to process a digital baseband signal received from modem 106 via trace or cable $108_k$ for transmitting the signal via the phased-array antenna $110_k$. For receive operations, each front-end subsystem $104_k$ is operable to process an RF signal (e.g., in a licensed and/or ISM microwave band(s)) received via the phased-array antenna $110_k$ to recover a baseband digital signal for communication to the modem 106 via trace $108_k$. The front-end subsystem $104_k$ is operable to control gain and/or amplitude of signals output to each of the elements $112_{1,1}$-$112_{N,M}$ of array $110_k$ to achieve beamforming. The gain and/or amplitude of the signals may be set to compensate for static misalignment between the small cell backhaul transceiver $100_j$ and the link partner with which the small cell backhaul transceiver $100_j$ desires to communicate via array $110_k$. Additionally, or alternatively, the gain and/or amplitude of the signals may be controlled dynamically (i.e., while the signals are being transmitted and/or received via array $110_k$) to compensate for dynamic movement (e.g., due to wind) of the small cell backhaul transceiver $100_j$ and/or of the link partner with which it is communicating via array $110_k$. An example front-end subsystem $104_k$ is described below with reference to FIG. 2.

Figure 2:
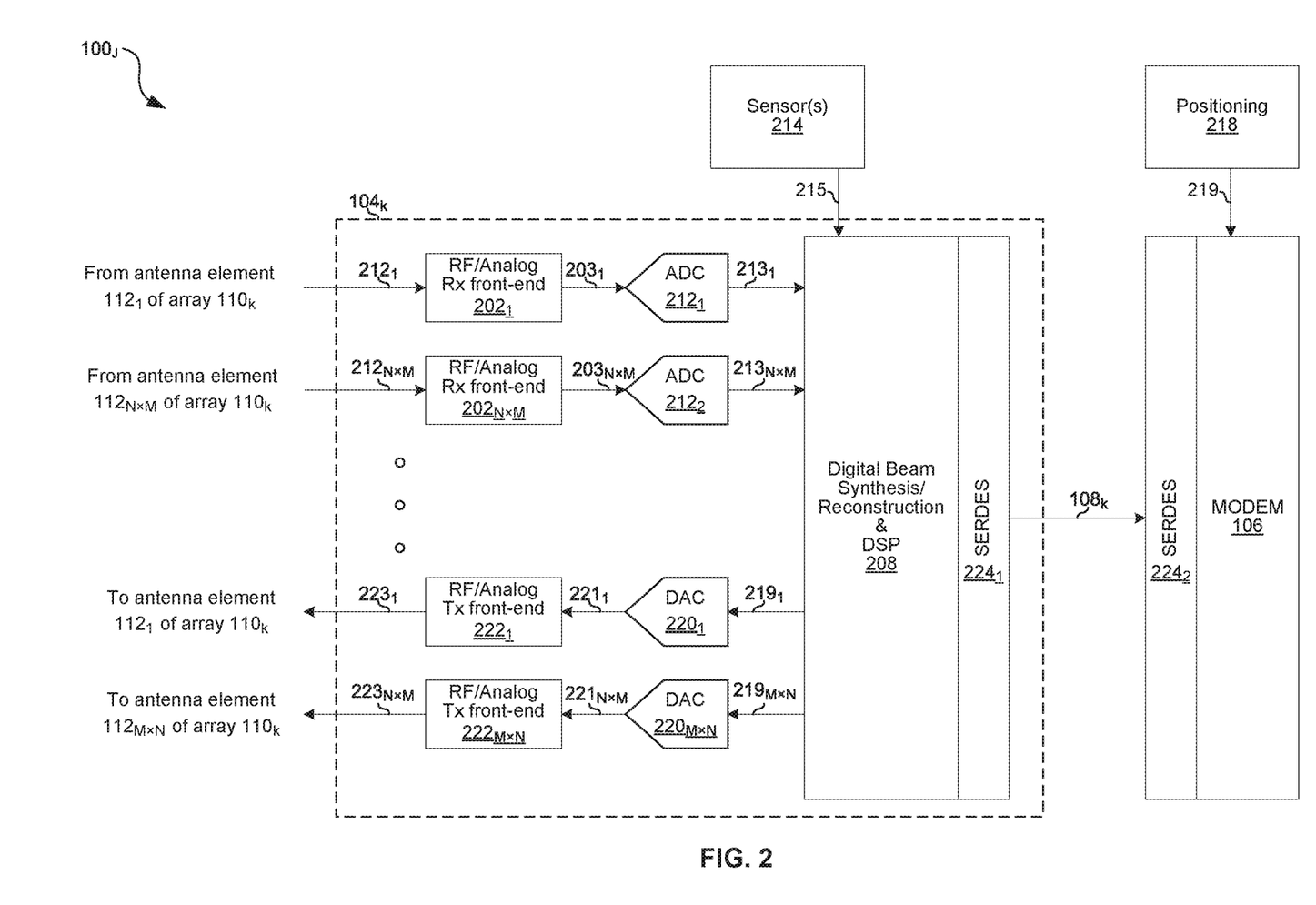
FIG. 2 depicts additional details of the autoconfigured small cell backhaul transceiver of FIG. 1

FIG. 2 depicts additional details of the autoconfigured small cell backhaul transceiver of FIG. 1. In the example small cell backhaul transceiver $100_j$ of FIG. 2, beamforming is performed in the digital domain. In other implementations, beamforming may be performed in the analog domain or in a combination of the analog and digital domains. Components of small cell backhaul transceiver $100_j$ shown in FIG. 2 include sensors 214, positioning circuit 218, modem 106, serializer/deserialzer (SERDES) circuits $224_1$ and $224_2$, and front-end subsystem $104_k$. The front-end subsystem $104_k$ comprises receiver front-end circuits $202_1$-$202_{M \times N}$, analog-to-digital converters (ADCs) $212_1$-$212_{M \times N}$, transmitter front-end circuits $222_1$-$222_{M \times N}$, digital-to-analog converters ($220_1$-$220_{M \times N}$), and digital signal processing circuit 208.

The sensor(s) 214 may comprise, for example, a gyroscope, accelerometer, compass, and/or the like. The sensor(s) 214 may be operable to detect an orientation of the small cell backhaul transceiver $100_j$, movement of the small cell backhaul transceiver $100_j$, wind load on the ODU 102, and/or the like. The sensor(s) 214 may output readings/measurements as signal 215.

The positioning circuit 218 may comprise, for example, a GPS receiver or other device operable to determine a location of the small cell backhaul transceiver $100_j$ and convey the position (e.g., GPS coordinates) to other circuitry of the small cell backhaul transceiver $100_j$, such as to DSP 208. Additionally, or alternatively, the positioning circuit 218 may comprise location information input by a field service technician or installer.

Each receiver front-end circuit $202_n$ ($1 \leq n \leq M \times N$) is operable to receive (e.g., via microstrip, stripline, waveguide, and/or the like) a signal $212_n$ from a respective antenna element $116_n$. Each front-end circuit 202 processes the signal $212_n$ by, for example, amplifying it (e.g., via a low noise amplifier LNA), filtering it, and/or down-converting it to an intermediate frequency or to baseband. The result of the processing performed by each circuit $202_n$ is a signal $203_n$.

Each ADC $212_n$ is operable to digitize signal $203_n$ to generate signal $213_n$. The bandwidth of the ADC $212_n$ may be sufficient such that it can concurrently digitize the entire microwave band of interest (e.g., 500 MHz in the 60 GHz ISM band or 1 GHz or more for E-band channels).

Each DAC $220_n$ is operable to convert digital signal $219_n$ to analog signal $221_n$. The bandwidth of the DAC $220_n$ may be sufficient such that it can concurrently convert the entire microwave band of interest (e.g., 500 MHz in the 60 GHz ISM band or 1 GHz or more for E-band channels).

For reception, the DSP circuit 208 processes received digital signals $213_1$-$213_{M \times N}$ to generate a signal for output to the SERDES $224_1$. The processing may include performing functions such as: beamforming, interference cancellation (e.g., cross-polarization interference), I/Q mismatch calibration, channelization (to select the television stations, MPEG streams, etc. that are being requested by the IDU), band/channel translation, and/or band/channel stacking. The beamforming may comprise a weighted combining of the signals $213_1$-$213_{M \times N}$, where the weights are phase and/or amplitude coefficients calculated to achieve a desired receive antenna pattern.

For transmission, the DSP circuit 208 is operable to process signals received from the SERDES $224_1$ to generate the signals $219_1$-$219_{M \times N}$. The processing may include, for example, digital predistortion and beamforming. The beamforming may comprise generating M×N phase and/or amplitude weighted versions of a baseband signal to be transmitted and then outputting the M×N signals as signals $219_1$-$219_{M \times N}$.

The phase and amplitude coefficients for transmission and/or reception may be controlled dynamically (i.e., concurrently with the small cell backhaul transceiver $100_j$ transmitting and/or receiving via one or more of its arrays $110_0$-$110_K$ and corresponding subsystems $104_0$-$104_K$). The coefficients, and thus the antenna patterns, may be controlled based on the measurements/readings from the sensor(s) 214. The coefficients, and thus the antenna pattern(s), may be controlled to compensate for static misalignment (e.g., introduced during installation or subsequently as a result of wind, getting hit by on object, etc.) and/or dynamic misalignment (e.g., twist and sway that comes and goes with the wind).

Referring back to FIG. 1, in the example hexagonal/octahedral small cell backhaul transceiver $100_j$ shown, each front-end subsystem $104_k$ of the small cell backhaul transceiver $100_j$ is operable to generate a beam 114 having a 3 dB beamwidth 118 (e.g., 10°). In the example implementation shown, each beam $114_{j,k}$ may be steered an amount 116 (e.g., plus or minus 30°) in the azimuthal direction, thus enabling the six beams to cover the full 360°. Each lobe in its centered position is called out as $114_{j,k}$, steered to +30° is called out as $114_{j,k}+$, and steered to −30° is called out as $114_{j,k}-$. Additionally, one or more arrays $110_k$ that comprise a multidimensional array of elements may also be steerable in elevation (e.g., also plus or minus 30°).

Referring to FIGS. 1 and 2, small cell backhaul transceiver $100_j$ may be realized on any combination of one or more semiconductor (e.g., Silicon, GaAs) dies and/or one or more printed circuit boards residing in one or more enclosures/housings. As just one non-limiting example, each circuit $202_n$ may comprise one or more first semiconductor dies located as close as possible to (e.g., a few centimeters from) its respective antenna element $112_n$, the circuits 212, 208, and $224_1$ may comprise one or more second semiconductor dies on the same PCB as the first die(s), the circuits $224_2$ and 106 may reside on one or more third semiconductor dies on the same PCB, and the sensor(s) 214 may be discrete components connected to the PCB via wires or wirelessly.

Figure 3:
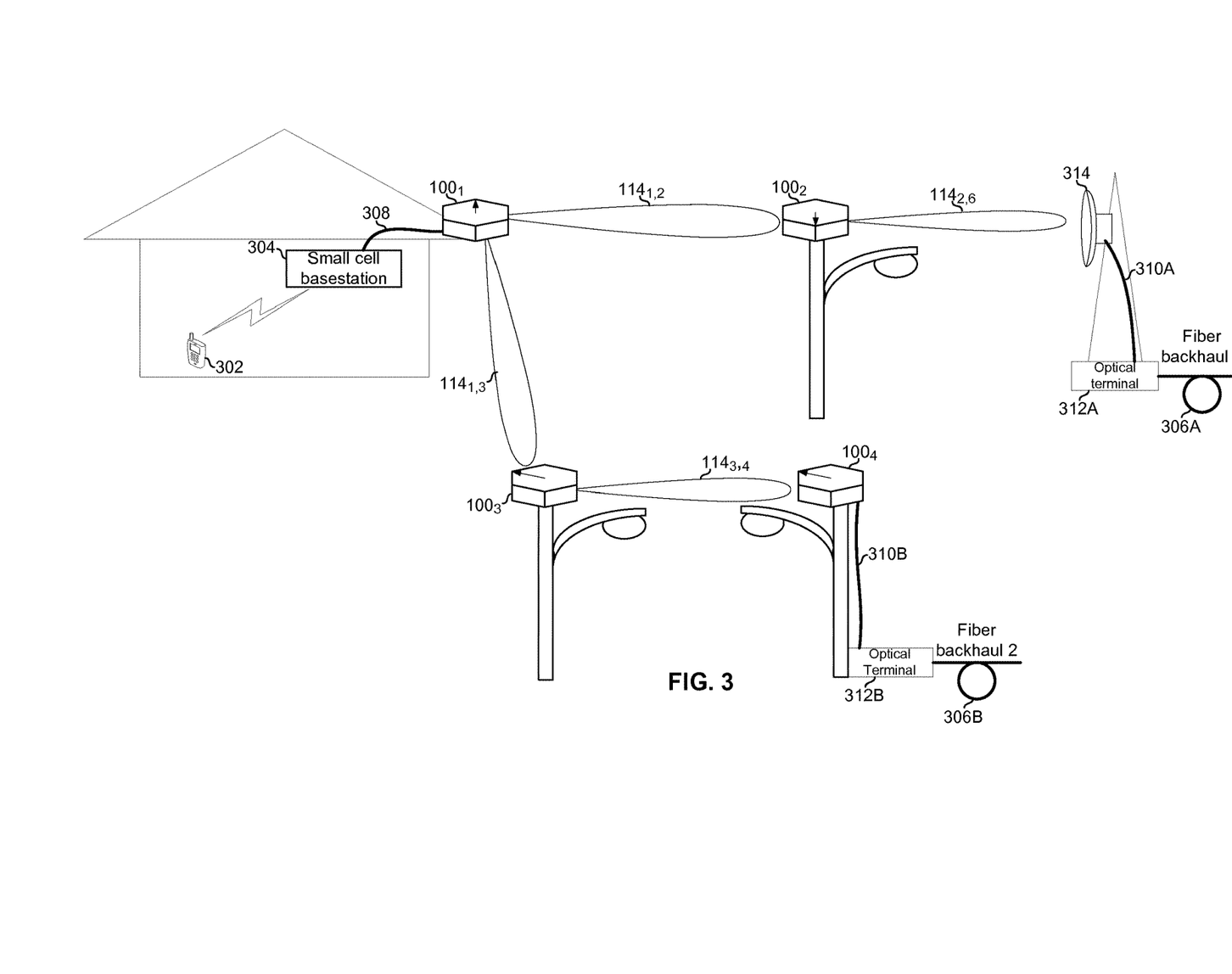
FIG. 3 depicts an example network comprising a plurality of instances of the small cell backhaul transceiver of FIG. 1.

FIG. 3 depicts an example network comprising a plurality of instances of the small cell backhaul transceiver of FIG. 1. In the example network, there are four instances of small cell backhaul transceiver $100_j$. The small cell backhaul transceiver $100_1$ is mounted to a building (e.g., a residence or commercial building) and each small cell backhaul transceiver $100_j$ ($2 \leq j \leq 4$, in the example shown) is mounted to a light pole (as an example, in practice they could be mounted anywhere). Also shown are a small cell basestation 304, a mobile device 302, a conventional microwave tower 314, optical terminals 312A and 312B, and fiber backhaul links 306A and 306. The arrows on the small cell backhaul transceivers $100_j$ indicate their respective azimuthal orientation (referenced to FIG. 1). In an example implementation, the azimuthal orientations may effectively be random as this may facilitate quick and easy installation (e.g., simply plugging small cell backhaul transceiver 100 into a preexisting light socket or outlet). That is, a rough alignment achieved by visual inspection, without precise instrumentation, may be sufficient since the combination of multiple arrays and ability to beam steer can compensate for misalignment in the azimuthal angle and/or angle of elevation.

The small cell backhaul transceiver $100_1$ is connected to small cell basestation 304 via link 308 (although a wired or optical link is shown, link 308 could be wireless). The small cell backhaul transceiver $100_4$ is connected to fiber backhaul 306B via link 310B (wired, wireless, or optical) and optical terminal 312B. The microwave tower 314 connects to fiber backhaul 306A via link 310A and optical terminal 312A.

In the example network shown, the small cell backhaul transceivers $100_1$-$100_4$ have automatically configured themselves to generate the depicted beams $114_{j,k}$ (for $1 \leq j \leq 4$ and $1 \leq k \leq 6$) for backhauling traffic of the small cell basestation 304 to one or both of fiber backhauls 306A and 306B. It is noted that, although only uplink beams are shown for clarity of illustration, the backhaul may concurrently handle bidirectional traffic, or may handle only downstream traffic.

The small cell backhaul transceiver $100_1$ has configured itself to receive data via link 308 and transmit the data to one or both of small cell backhaul transceivers $100_2$ and $100_3$. Small cell backhaul transceiver $100_1$ may transmit, for example, transmit to each concurrently or use one as a primary link and the other as a failover or backup. For transmitting to small cell backhaul transceiver $100_3$, the small cell backhaul transceiver $100_1$ uses its array $110_3$ and front-end subsystem $104_3$. For transmitting to small cell backhaul transceiver $100_3$, the small cell backhaul transceiver $100_1$ uses its array $110_4$ and front-end subsystem $104_4$.

The small cell backhaul transceiver $100_2$ has configured itself to receive data from small cell backhaul transceiver $100_1$ and to transmit the data to microwave tower 314. For receiving from small cell backhaul transceiver $100_1$, the small cell backhaul transceiver $100_2$ uses its array $110_3$ and front-end subsystem $104_3$. For transmitting to tower 314, the small cell backhaul transceiver $100_2$ uses its array $110_6$ and front-end subsystem $104_6$.

The small cell backhaul transceiver $100_3$ has configured itself to receive data from small cell backhaul transceiver $100_1$ to transmit the data to small cell backhaul transceiver $100_4$. For receiving from small cell backhaul transceiver $100_1$, the small cell backhaul transceiver $100_3$ uses its array $110_2$ and front-end subsystem $104_2$. For transmitting to small cell backhaul transceiver $100_4$, the small cell backhaul transceiver $100_2$ uses its array $110_4$ and front-end subsystem $104_4$.

The small cell backhaul transceiver $100_4$ has configured itself to receive data from small cell backhaul transceiver $100_3$ and to transmit the received data to the optical terminal 312B via link 310B. For receiving from small cell backhaul transceiver $100_1$, the small cell backhaul transceiver $100_3$ uses its array $110_1$ and front-end subsystem $104_1$.

Figure 4:
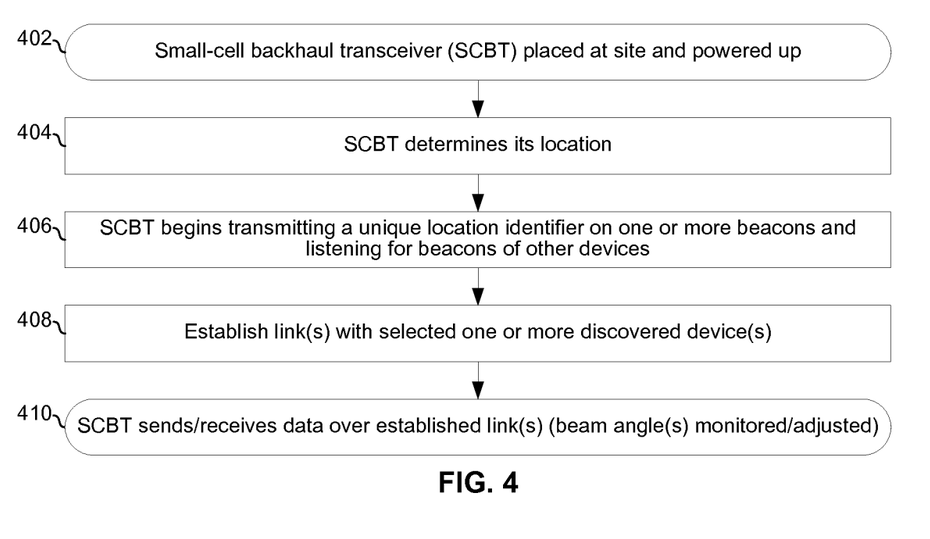
FIG. 4 is a flowchart illustrating an example network discovery process performed by the small cell backhaul transceiver of FIG. 1.

FIG. 4 is a flowchart illustrating an example network discovery process performed by the small cell backhaul transceiver of FIG. 1.

In block 402, a small cell backhaul transceiver 100 is installed at a location in need of backhaul capacity (e.g., on a light pole, on a building, or in a building in a densely populated area).

In block 404, the small cell backhaul transceiver 100 determines its location via any means available. In an example implementation, the small cell backhaul transceiver 100 determines its location via an on-board GPS receiver. In an example implementation, the location of the small cell backhaul transceiver 100 is simply programmed into it by an installer (or in the factory upon the small cell backhaul transceiver 100 being allocated for deployment to a particular location).

In block 406, the small cell backhaul transceiver 100 begins transmitting one or more beacons carrying a unique identifier of its location (e.g., GPS coordinates and/or street address). The small cell backhaul transceiver 100 also begins listening for beacons of potential link partners (other small cell backhaul transceivers 100 and/or conventional microwave backhaul towers). Beacon transmit and receive may be concurrent or time division duplexed. In an example implementation, the beacon may be simultaneously transmitted via all (or a subset) of antenna arrays $110_1$-$110_K$ of the small cell backhaul transceiver 100. Furthermore, during beacon transmission and/or listening, each array may scan a range of azimuthal and elevation angles (i.e., vary the radiation pattern(s) of the array(s) via which the beacon is transmitted. In another example implementation, the small cell backhaul transceiver may comprise an omnidirectional antenna (not shown) used for beacon transmission and reception.

In block 408, the small cell backhaul transceiver 100 may establish links with one or more devices discovered in block 406. In an example implementation, the established links may use a different frequency than the frequency used for the beacon in block 406. For example, established links may use a licensed microwave band (e.g., 70 or 80 GHz) while the beacon may use an unlicensed band such as 60 GHz (the low bit rate of the beacon allowing for relatively high-power transmissions while still complying with applicable regulations for use of such unlicensed frequencies). As another example, both the established links and the beacon may use a licensed band, or both may use an unlicensed band.

In block 410, the small cell backhaul transceiver 100 sends and/or receives backhaul traffic via the links established in block 408. The beam angles (i.e., antenna radiation patterns of) may be periodically, occasionally, or continually adjusted to maintain sufficient link margin.

Figure 5:
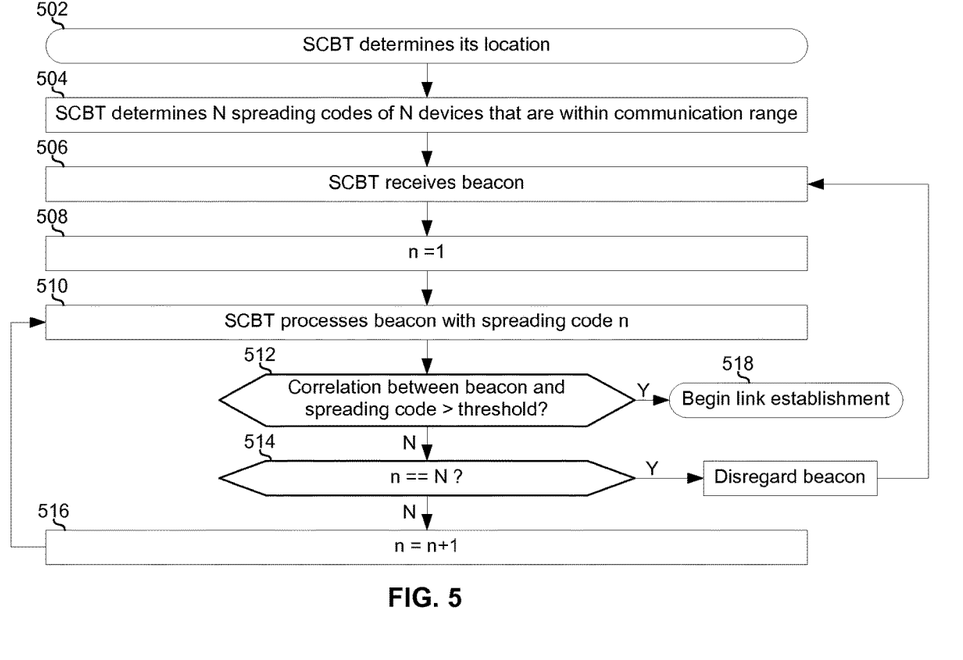
FIG. 5 is a flowchart illustrating an example network discovery process performed by the small cell backhaul transceiver of FIG. 1.

FIG. 5 is a flowchart illustrating an example network discovery process performed by the small cell backhaul transceiver of FIG. 1.

In block 502, the small cell backhaul transceiver $100_j$ determines its location via any means available. In an example implementation, the small cell backhaul transceiver $100_j$ determines its location via an on-board GPS receiver. In an example implementation, the location of the small cell backhaul transceiver 100 is simply programmed into it by an installer (or in the factory upon the small cell backhaul transceiver 100 being allocated for deployment to a particular location). In an example implementation, the location of the small cell backhaul transceiver $100_j$ is determined based on triangulation using received signals. For example, a plurality of beacons received from a plurality of other small cell backhaul transceivers (each carrying a unique location identifier), and the strength at which the beacons are received, may be used to determine a location of the small cell backhaul transceiver $100_j$.

In block 504, the small cell backhaul transceiver $100_j$ determines N spreading codes of N devices that are within communication range of the location determined in block 502. In an example implementation, the spreading codes may be determined via a look-up table stored on-board small cell backhaul transceiver $100_j$ or in a network accessible location (e.g., the small cell backhaul transceiver $100_j$ may have a cellular or wi-fi transceiver for obtaining such information). In another example implementation, the spreading codes may be determined algorithmically starting from the unique location identifiers, such that large tables of up-to-date spreading codes need not be maintained. For example, upon determining its GPS coordinates, the small cell backhaul transceiver 100 may determine N sets of GPS coordinates corresponding to locations $L_1$-$L_{10}$ that are within communication range of the SCBT 100. The small cell backhaul transceiver $100_j$ may then apply a determined hash function to each of the N sets of coordinates to arrive at N spreading codes. Spreading code n ($1 \leq n \leq N$) determined in this manner is the spreading code that would be used by a small cell backhaul transceiver $100_n$ located at position $L_n$. Using location-based spreading codes enables automatic discovering of link partners while keeping the spreading code search space to a manageable level (i.e., the small cell backhaul transceiver $100_j$ does not need to try, or even know, the spreading code for every possible small cell backhaul transceiver 100—only those that are within a determined geographical area).

In block 506, the small cell backhaul transceiver $100_j$ receives a beacon.

In block 508, a counter n is set to 1.

In block 510, the small cell backhaul transceiver $100_j$ processes the received beacon using the spreading code n.

In block 512, if the correlation between the beacon and spreading code N is above a determined threshold, then the spreading code was the correct spreading code and the small cell backhaul transceiver $100_j$ knows that the beacon was received from another small cell backhaul transceiver located at location $L_n$. Accordingly, the process proceeds to block 518 and the small cell backhaul transceiver $100_j$ attempts to establish a link with the discovered other small cell backhaul transceiver. Alternatively (or additionally), if a valid location identifier (or some other coherent information) is recovered from the beacon after processing it with spreading code N, then it may be determined that the beacon originated from a small cell backhaul transceiver at location $L_n$.

Returning to block 512, if the correlation between the beacon and spreading code n is below the determined threshold, then process advances to block 514.

In block 514, it is determined whether counter n is equal to N. If so, then all of the spreading codes have been tried without success and, in block 520, the received beacon is disregarded. For example the beacon may have been from a small cell backhaul transceiver outside of the desired communication range, or the signal may not have been a beacon at all.

Returning to block 514, if all the spreading codes have not yet been tried on the received beacon, then n is incremented and the process returns to block 510.

In accordance with an example implementation of this disclosure, a microwave backhaul transceiver (e.g., $100j$) comprises a plurality of antenna arrays (e.g., $112_{1,1}$-$112_{N,M}$), positioning circuitry (e.g., 218), and signal processing circuitry (e.g., $104_1$-$104_K$ and/or MODEM 106). The microwave backhaul transceiver may determine, via the positioning circuitry, a location of the small cell backhaul transceiver. The microwave backhaul transceiver may, generate, via the signal processing circuitry, a beacon signal that uniquely indicates the location. The microwave backhaul transceiver may transmit the beacon signal via at least one of the antenna arrays. The beacon signal may be generated using a spreading code generated from a unique identifier of the location. The unique identifier of the location may comprise global positioning system coordinates, and/or a street address. The microwave backhaul transceiver may comprise a plurality of front-end circuits, each of which may control a directionality at which the beacon radiates from a respective one of the antenna arrays. During the transmitting, a directionality at which the beacon radiates from a particular one of the antenna arrays may be varied such that the beacon is transmitted in multiple directions from the particular one of the antenna arrays. The signal processing circuitry may determine a plurality of spreading codes of possible link partners based on the location of the microwave backhaul transceiver, wherein the plurality of spreading codes are a subset of all possible spreading codes. The microwave backhaul transceiver may receive a signal via at least one of the antenna arrays, process the received signal with the plurality of spreading codes to generate a plurality of despread signals, and determine a source of the received signal based on the plurality of despread signals.

In accordance with an example implementation of this disclosure, a microwave backhaul transceiver (e.g., $100j$) may comprise an antenna array (e.g., $112_{1,1}$), positioning circuitry (e.g., 218), and signal processing circuitry (e.g., $104_1$-$104_K$ and/or MODEM 106). The microwave backhaul transceiver may determine a first unique location identifier for a location of the microwave backhaul transceiver. The microwave backhaul transceiver may determine a plurality of second unique location identifiers that are within communication range of the first unique location identifier. The microwave backhaul transceiver may generate a plurality of first spreading codes based on the plurality of second unique location identifiers. The microwave backhaul transceiver may use the plurality of first spreading codes for processing signals received via the antenna array. The microwave backhaul transceiver may generate a second spreading code based on the first unique location identifier, generate a beacon using the second spreading code, and transmit the beacon via the antenna array.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
in a microwave backhaul transceiver comprising a plurality of antenna arrays, positioning circuitry, a sensor and signal processing circuitry:
determining, via said positioning circuitry, a location of said microwave backhaul transceiver;
determining, via said sensor, an orientation of said microwave backhaul transceiver, wherein said microwave backhaul transceiver is operable to adjust said orientation based on a wind load;
identifying, via said signal processing circuitry, a beacon signal, wherein said beacon signal includes a unique identifier of said location;
responsive to a determination that a correlation value between the beacon signal and a spreading code is above a determined threshold, determining that the beacon signal was received from a second backhaul transceiver; and
establishing a link with the second backhaul transceiver.

2. The method of claim 1, wherein said unique identifier of said location comprises global positioning system coordinates.

3. The method of claim 1, wherein said unique identifier of said location comprises a street address.

4. The method of claim 1, wherein:
said microwave backhaul transceiver comprises a plurality of front-end circuits.

5. The method of claim 1, comprising determining, by said signal processing circuitry, a plurality of spreading codes of possible link partners based on said location, wherein said plurality of spreading codes are a subset of all possible spreading codes.

6. The method of claim 5, comprising:
receiving a signal via at least one of said antenna arrays;
processing said received signal with said plurality of spreading codes to generate a plurality of despread signals; and
determining a source of said received signal based on said plurality of despread signals.

7. A system comprising:
a microwave backhaul transceiver comprising a plurality of antenna arrays, positioning circuitry, a sensor and signal processing circuitry, wherein:
said positioning circuitry is operable to determine a location of said microwave backhaul transceiver;
said sensor is operable to determine an orientation of said microwave backhaul transceiver, wherein said microwave backhaul transceiver is operable to adjust said orientation based on a wind load; and
said signal processing circuitry is operable to identify a first beacon and disregard the first beacon responsive to a determination that a correlation between the first beacon and a first spreading code is below a determined threshold, generate, in view of a second beacon and for transmission via at least one of said antenna arrays, a beacon signal that uniquely indicates said location, wherein said beacon signal is controlled dynamically according to said orientation, and wherein said signal processing circuitry is operable to generate said beacon signal using a second spreading code algorithmically generated from a unique identifier of said location, and wherein said signal processing circuitry comprises a digital to analog converter (DAC) operable to convert a microwave band comprising said beacon signal from a digital signal to an analog signal.

8. The system of claim 7, wherein said unique identifier of said location comprises global positioning system coordinates.

9. The system of claim 7, wherein said unique identifier of said location comprises a street address.

10. The system of claim 7, wherein:
said microwave backhaul transceiver comprises a plurality of front-end circuits; and each of said front-end circuits is operable to control a directionality at which said beacon signal radiates from a respective one of said antenna arrays.

11. The system of claim 7, wherein:
said microwave backhaul transceiver comprises a plurality of front-end circuits; and
each of said front-end circuits is operable to vary a directionality at which said beacon signal radiates from a particular one of said antenna arrays such that said beacon is transmitted in multiple directions from said particular one of said antenna arrays.

12. The system of claim 7, wherein said signal processing circuitry is operable to determine a plurality of spreading codes of possible link partners based on said location, wherein said plurality of spreading codes are a subset of all possible spreading codes.

13. The system of claim 12, wherein said signal processing circuitry is operable to:
process a received signal with said plurality of spreading codes to generate a plurality of despread signals; and
determine a source of said received signal based on said plurality of despread signals.

* * * * *